US012187456B2

(12) United States Patent
Fadlovich et al.

(10) Patent No.: US 12,187,456 B2
(45) Date of Patent: Jan. 7, 2025

(54) SYSTEM AND METHOD FOR A MANUFACTURING ENVIRONMENT WITH ROBOTIC SYSTEM MOUNTS HAVING ONE OR MORE END EFFECTORS POSITIONED SYMPATHETIC TO THE UNDERLYING MANUFACTURED ITEM

(71) Applicant: Airbus Operations GmbH, Hamburg (DE)

(72) Inventors: Chace Fadlovich, Mukilteo, WA (US); Michael Woogerd, Mukilteo, WA (US); Eric Pospisil, Mukilteo, WA (US); Eric Davis, Mukilteo, WA (US)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/194,261

(22) Filed: Mar. 31, 2023

(65) Prior Publication Data

US 2024/0327035 A1    Oct. 3, 2024

(51) Int. Cl.
*B23P 19/04* (2006.01)
*B64F 5/10* (2017.01)

(52) U.S. Cl.
CPC ..................... *B64F 5/10* (2017.01)

(58) Field of Classification Search
CPC ............... B29C 66/53241; B29C 70/32; B25J 11/005; B23P 19/10; B23P 19/04; B23P 2700/01; B64F 5/10
See application file for complete search history.

(56) References Cited

U.S. PATENT DOCUMENTS

| | | | |
|---|---|---|---|
| 9,645,012 | B2 | 5/2017 | Marsh et al. |
| 10,315,255 | B2 | 6/2019 | Albert et al. |
| 10,500,710 | B2 | 12/2019 | Albert et al. |
| 11,534,885 | B2 | 12/2022 | Scafutto Scotton et al. |

(Continued)

FOREIGN PATENT DOCUMENTS

| | | | |
|---|---|---|---|
| EP | 0341134 A1 | | 11/1989 |
| CN | 204913454 U | * | 12/2015 |
| DE | 4433925 A1 | | 3/1996 |

(Continued)

OTHER PUBLICATIONS

Tadviser, Xyrec, Airbus Group, 2019 Announcement, Automated Paint Robot, https://tadviser.com/index.php/Product:Automated_Paint_Robot_%28APR%29.

(Continued)

*Primary Examiner* — Jun S Yoo
(74) *Attorney, Agent, or Firm* — Greer, Burns & Crain, Ltd.

(57) ABSTRACT

A robotic manufacturing system includes a track extending along a length of a component of a partially manufactured item, wherein the component has a non-constant longitudinal shape, the track being supported independently of the partially manufactured item. The system includes a jointed member having an elongated arcuate shape, a mount longitudinally movable along the track and configured to receive the jointed member in an articulating manner, and an end effector movably mounted on the jointed member. The jointed member is movable along a portion of the component length in a radial position sympathetic to the non-constant component longitudinal shape. The jointed member is longitudinally movable relative to the mount along its elongated arcuate shape such that the jointed member will move in an arc spaced from and around an outer component (Continued)

surface. A portion of the end effector is movable along a length of the jointed member.

10 Claims, 11 Drawing Sheets

(56) References Cited

U.S. PATENT DOCUMENTS

| | | | |
|---|---|---|---|
| 2002/0007548 A1* | 1/2002 | Stoewer | B21J 15/10 29/525.06 |
| 2006/0068109 A1 | 3/2006 | Frankenberger et al. | |
| 2019/0002130 A1* | 1/2019 | Whitlaw | B25J 9/0036 |

FOREIGN PATENT DOCUMENTS

| | | |
|---|---|---|
| EP | 2952890 A2 | 12/2015 |
| FR | 3060429 A1 | 6/2018 |
| FR | 3061054 A1 | 6/2018 |

OTHER PUBLICATIONS

Felix Von Drigalski and Airbus Group, Winning team story: The ups and downs of building a drilling robot for the Airbus Shopfloor Challenge, Jun. 1, 2016, https://robohub.org/winning-team-story-the-ups-and-downs-of-building-a-drilling-robot-for-the-airbus-shopfloor-challenge/.

Age Fotostock, Oct. 1, 2019, https://www.agefotostock.fr/age/fr/informations-photo-d'actualit%C3%A9/01-octobre-2019-hambourg-deux-robot-percer-cadre-rivet-nouveau-structurel-assemblage-airbus-a320-famille-hangar-245-airbus-plante/PAH-191001-99-112706-dpai.

Dr. Jody Muelaner, Sep. 24, 2020, Feature: Robots take on more aerospace tasks thanks to accuracy boost, https://www.imeche.org/news/news-article/feature-robots-take-on-more-aerospace-tasks-thanks-to-accuracy-boost.

European Search Report from corresponding European application No. EP24164680, completed Aug. 26, 2024.

* cited by examiner

SYSTEM AND METHOD FOR A MANUFACTURING ENVIRONMENT WITH ROBOTIC SYSTEM MOUNTS HAVING ONE OR MORE END EFFECTORS POSITIONED SYMPATHETIC TO THE UNDERLYING MANUFACTURED ITEM

FIELD OF THE INVENTION

In a manufacturing environment, robotic manufacturing systems that are designed to accomplish one or more localized tasks on a large, relatively immovable, object, wherein the end effectors tasked with accomplishing manufacturing tasks are positioned on fixed tracks having a contour path sympathetic to the underlying manufactured item.

BACKGROUND OF THE INVENTION

Airplane assembly and manufacturing is intricate and involved. As modern airplanes are large and difficult to assemble in a "rolling" manufacturing setting (e.g., like the way that automobiles are assembled and manufactured), airplanes are often set in lace with all robotic tooling and automation moving about fixed in place structures supporting the portions of the airplane (e.g., the fuselage, the wings, and the like).

Past solutions involved having mountable robotic systems that were assembled contacting the fuselage, wing, or other underlying manifesting item. For example, as shown in FIG. 1, prior art robotic manufacturing devices (e.g., end effectors) were mounted onto a movable track that could be mounted directly to a surface of an underlying manufactured item, such as the fuselage or a wing.

This was problematic because putting the movable track in place took time and such tracks-mounted robots engaged (e.g., mounted directly to) the item causing possible damage and impact to the manufactured item. While the movable track provided flexibility with where it could be applied and used, the time needed to set the system in place was time consuming and inefficient. Further, these past solutions required contact with the manufactured item led to time-consuming dis-engagement, as well as additional possible damage or impact to the items. Further yet, in some applications, such as painting and body preparation, mounting something to the very surface in need of painting or cleaning is problematic because the surface under the track cannot be accessed. Also, freshly painted surfaces cannot be engaged immediately, leading to a downtime in the manufacturing process.

SUMMARY OF THE INVENTION

A robotic manufacturing system having a plurality of rigid track mounts with one or more end effectors, wherein the track mounts are styled and fixed sympathetic to the underlying manufactured item while remaining unengaged with the underlying manufactured item. That is, the tracks are not mounted on the underlying manufactured surface, but rather in a rigid (non-flexible) manner near the surface and sympathetic to the surface. Having end-effector paths formed from rigid fixed tracks that follow the underlying contour (e.g., sympathetic) of the manufactured item leads to a number of advantages over prior art mounted flexible track systems or 6-axis robots, as follows:

Not mounting directly to the surface allows for drilling, fastening, inspection, welding, sanding, cleaning, preparation and painting of the body of the airplane using a robotic system with jointed members that have multiple degrees of freedom.

Not mounting directly to the surface allows for painting decals via ink-jet or laser jet printing techniques.

A system having a jointed member allows for multiple end effectors working at the same time on the same member.

A non-surface mounted system can be adapted to existing manufacturing environments, wherein existing mounts can simply be worked around until the place can stand alone on its wheels.

A robotic manufacturing system embodying the principles of the present invention may include:
- a track extending along a length of a component of a partially manufactured item, wherein the component has a non-constant longitudinal shape, the track being supported independently of the partially manufactured item,
- at least one jointed member,
- a mount longitudinally movable along the track and configured to receive the jointed member in an articulating manner,
- at least one end effector movably mounted on the jointed member,
- wherein the jointed member is movable along at least a portion of the length of the component in a radial position that is sympathetic to the non-constant longitudinal shape of the component.

The term non-constant longitudinal shape, as used herein, is meant to mean that the outer contour of the component, at least in the area where the track is to be located, has a non-constant radial distance from a longitudinal axis of the component, such as a curved shape along a length of the fuselage, such as a or a linear shape that is angled relative to the longitudinal axis, such as a wing component that has a wider chord near a root of the wing than a narrower chord near a tip of the wing.

The term sympathetic, as used herein regarding the position of the jointed member relative to a surface of the item or component, is meant to mean that as the jointed member is moved along the length of the item or component, the jointed member will be moved up or down, side to side, or in some similar fashion to approximate the changing shape of the component or item, while not being limited to following the shape exactly or precisely, but in such a manner that the jointed member will be maintained within a predetermined range of distances from the surface, which may vary in a range determined by the range of motion of the end effectors relative to the jointed members as the jointed member moves along the length of the item or component. Thus, the relative distance from the jointed member may vary along the length if the item or component, and movement of the jointed member towards or away from the surface of the item or component may change before or after the shape of the item or component changes along its length.

The manner of arranging for the jointed member to move in a sympathetic manner may be accomplished in different manners.

A longitudinal shape of the track may be sympathetic to the non-constant longitudinal shape of the component.

The mount may be configured to change a horizontal position of the jointed member as the mount longitudinally moves along the track when the component is arranged in a horizontal elongated position.

The jointed member may have an elongated arcuate shape.

The jointed member may be longitudinally movable relative to the mount along its elongated arcuate shape such that the jointed member would move in an arc spaced from and around an outer surface of the component.

Two jointed members may be received in the mount, each member being independently longitudinally movable relative to the mount along the elongated arcuate shape of the jointed member, such that each jointed member would move in an arc spaced from and around an outer surface of said component.

The jointed member may extend through of an arc of greater than 180 degrees along the elongated arcuate shape of the jointed member.

The jointed member may extend through of an arc of less than 180 degrees along the elongated arcuate shape of the jointed member.

At least a portion of the end effector may have at least 6 degrees of freedom of movement relative to the jointed member.

At least a portion of the end effector may be movable along a length of the jointed member.

At least a portion of the end effector may be movable laterally relative to the jointed member.

At least a portion of the end effector may be movable radially relative to the elongated arcuate shape of the jointed member.

At least a portion of the end effector may be movable angularly relative to the jointed member.

At least one jointed member may be configured to carry a plurality of end effectors.

Each end effector of the plurality of end effectors may be independently movable on the jointed member.

The track may be positioned above a top of the component when the component is arranged in a horizontal elongated position.

The track may be positioned below a bottom of the component when the component is arranged in a horizontal elongated position.

The end effector may be interchangeably mounted on the jointed member.

The end effector may be configured to perform a task consisting of at least one of: sanding, cleaning, preparing, painting, drilling, welding, fastening, inspecting, printing.

The track may terminate in an interchange station wherein the end effector may be removed from the jointed member and replaced with a different end effector.

The component may be a fuselage of an aircraft.

The component may be a wing of an aircraft.

The non-constant shape may comprise generally a cylinder having a non-constant diameter along a length thereof.

The non-constant shape may comprise a shape that tapers along a length thereof.

More than one track may be provided adjacent to the component.

More than one mount may be movably mounted on the track.

The present invention also provides a method of manufacturing a component of a partially manufactured item, utilizing a robotic manufacturing system comprising:

a track extending along a length of the component of the partially
manufactured item, wherein the component has a non-constant longitudinal shape, and is supported independently of the component,
at least one jointed member,
a mount longitudinally movable along the track and configured to receive the jointed member in an articulating manner,
at least one end effector mounted on the jointed member, wherein the jointed member is movable along at least a portion of the length of the component in a path that is sympathetic to the non-constant longitudinal shape of the component, the method comprising the steps:
moving, in a first moving step, at least one of the mount, the jointed member, or the end effector relative to the track, to position at least a portion of the end effector in an operating position relative to the component,
operating the end effector to perform a manufacturing step on the component,
moving, in a second moving step, at least one of the mount, the jointed member, or the end effector relative to the track, to distance the at least a portion of the end effector from the operating position.

The first moving step may comprise moving the jointed member in a path that is sympathetic to the non-constant longitudinal shape of the component.

The first moving step may comprise moving the mount longitudinally along the track.

The first moving step may comprise moving a portion of the mount to change a vertical position of the jointed member relative to the component.

The jointed member may have an elongated arcuate shape and the first moving step may comprise moving the jointed member, along the elongated shape of the jointed member relative to the mount, to move the jointed member in an arc spaced from and around an outer surface of the component.

The first moving step may comprise moving at least a portion of the end effector through at least one of 6 degrees of freedom of movement relative to the elongated arcuate shape of the jointed member.

The first moving step may comprise moving at least a portion of the end effector along a length of the jointed member.

The first moving step may comprises moving at least a portion of the end effector laterally relative to the jointed member.

The jointed member may have an elongated arcuate shape and the first moving step may comprise moving at least a portion of the end effector radially relative to the elongated arcuate shape of the jointed member.

The first moving step may comprise moving at least a portion of the end effector angularly relative to the jointed member.

At least one jointed member may be configured to carry a plurality of end effectors, and the first moving step may comprise moving each end effector independently on the jointed member.

The end effector may be interchangeably mounted on the jointed member, and following the second moving step, the end effector may be moved to an interchange station wherein the end effector may be removed from the jointed member and replaced with a different end effector.

More than one track may be provided adjacent to the component, and jointed members, mounts and end effectors may be carried on each track, such that the first moving step may be undertaken at more than one track simultaneously.

More than one mount may be movably mounted on the track, such that the first moving step may comprise moving more than one mount simultaneously.

More than one end effector may be movably mounted on the jointed member, such that the first moving step may comprise moving more than one end effector simultaneously.

A method of manufacturing a manufacturing a component of a partially manufactured item, utilizing a robotic manufacturing system is provided comprising:

a track extending along a length of the component of the partially manufactured item, wherein the component has a non-constant longitudinal shape and at least one horizontal or vertical projection or support extending from a surface of the component, the track being supported at a distance from and independently of the component, at least one jointed member, a mount longitudinally movable along the track and configured to receive the jointed member in an articulating manner, at least one end effector mounted on the jointed member, wherein the jointed member is movable along at least a portion of the length of the component in a path that is sympathetic to the non-constant longitudinal shape of the component, the method comprising the steps:

moving, in a first moving step, the jointed member, to a position where an end of the jointed member will avoid contact with the at least one horizontal or vertical projection while moving the mount, in a second moving step, along the track horizontally past the at least one horizontal or vertical projection, moving, in a third moving step, the jointed member, to a position in which the end of the jointed member would otherwise contact the at least one horizontal or vertical projection if the mount and jointed member would be moved relative to the track into a region vertically aligned with the at least one horizontal or vertical projection, moving, in a fourth moving step, at least one of the mount, the jointed member, or the end effector relative to the track to position at least a portion of the end effector in an operating position relative to the component, operating the end effector to perform a manufacturing step on the component, moving, in a fifth moving step, at least one of the mount, the jointed member, or the end effector relative to the track to distance the at least a portion of the end effector from the operating position.

DETAILED DESCRIPTION OF THE PREFERRED EMBODIMENTS

Figure 1:
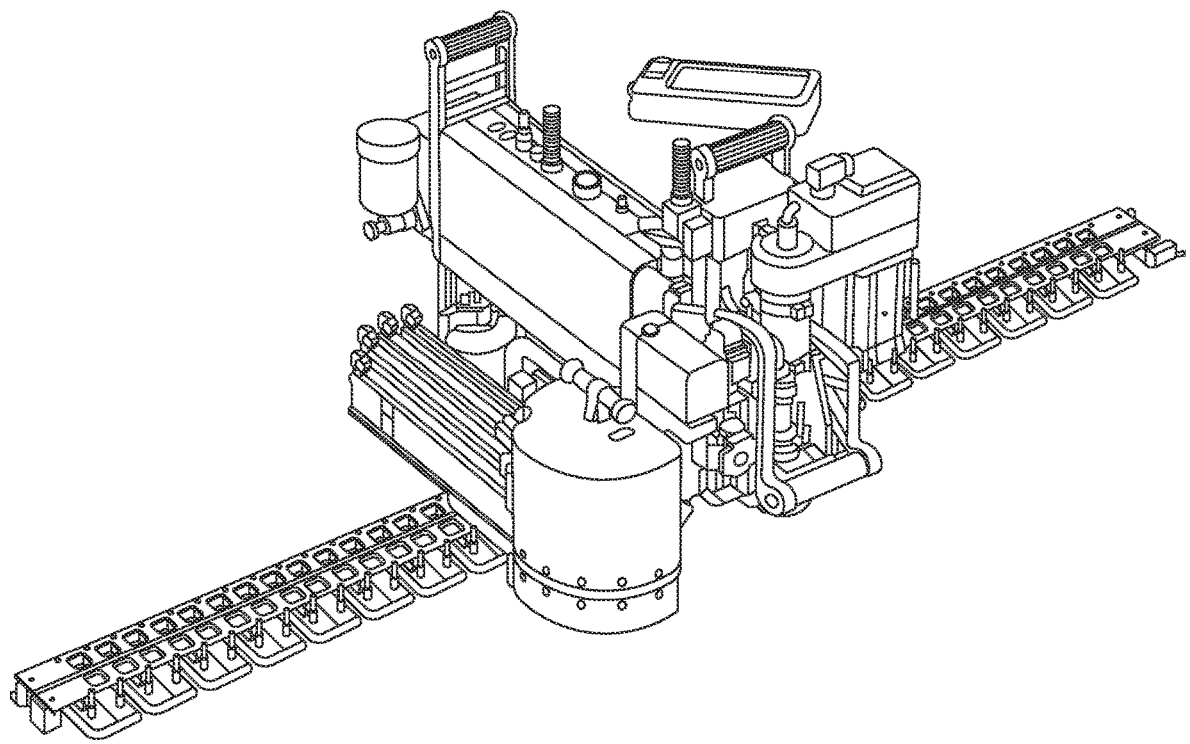
FIG. 1 is a perspective view of a prior art robotic manufacturing system in which the track was mounted directly to the manufactured item, such as an aircraft fuselage.
Figure 2:
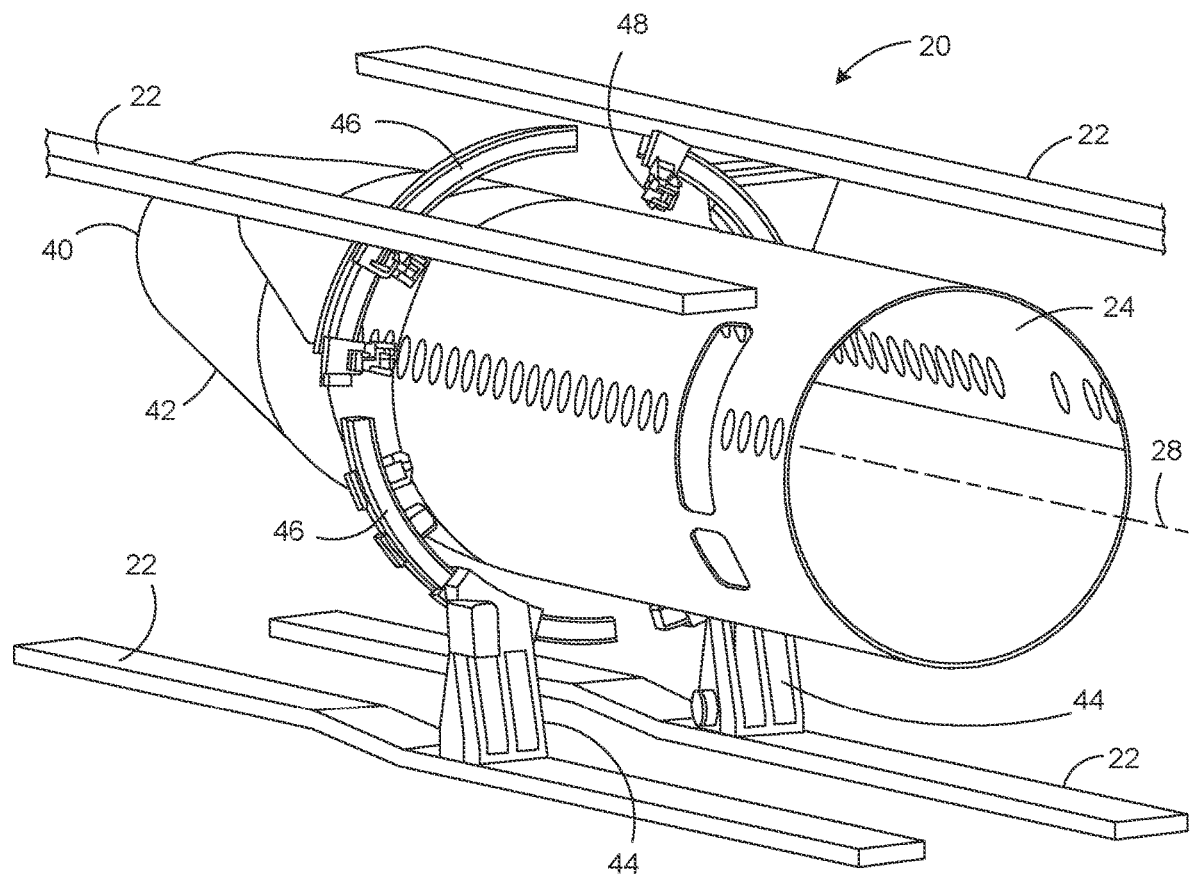
FIG. 2 is a perspective schematic view of a robotic manufacturing system embodying the principles of the present invention, showing four tracks mounted independently of the fuselage component of the manufactured airplane item, with two of the tracks being shaped sympathetically to the shape of the fuselage.

FIG. 2 shows an embodiment of a robotic manufacturing system 20 having sympathetic mounts 22 positioned adjacent to a fuselage 24 of an airplane. Other portions of an airplane, such as wings 26, are shown in other Figs., such as FIG. 5. In this embodiment, there are four sympathetic tracks 22 positioned at relatively equidistant intervals about a longitudinal axis 28 of the fuselage 24. These positions are referred to as upper right 30, upper left 32, lower right 34, and lower left 36, so as to divide the manufactured surfaces of the fuselage 24 into four quadrants. With these longitudinal track paths 22 in place, the contour of the track paths may be sympathetic to the contour or shape of the fuselage 24. That is, each track path 22 is sympathetic to the underlying component of the manufactured item, in this case the fuselage 24, in that there exists at least one deviation 38 from linear for each track path.

Each sympathetic track path 22 may have curvatures that are similar, but not perfectly matched to the underlying manufactured part 24. In this respect, a generalized "bend" 38 near and end 40 of the fuselage 24 may be positioned sympathetic enough to still undertake manufacturing tasks on a specific airplane fuselage, but also may be able to do so on another similar, but different, airplane fuselage (e.g., different models of similarly sized airplanes). That is, the path of the track 22 is not necessarily equivalent or identical to the contour of the underlying manufactured item 24, but rather just sympathetic to it, in that the shape of the track 22 generally follows the contour of the fuselage 24 or other component.

Each track 22 may have one or more mounts 4 that are movable along a length of the track, each mount carrying at least one jointed member 46 attached thereto. These jointed members 46 are designed to move in an arc around the fuselage 24 and are motivated by a central motivator (e.g., the mobile mount 44). These mounts 44 may move forward and backward along the sympathetic tracks 22. As such, actuating a jointed member 46 all the way to one side of the mount 44 and moving the mobile mount forward or backward along the track 22, the entire assembly may avoid a wing, or other protrusion from the fuselage 24 during the manufacturing and assembly. Further, each jointed member 46 may have more than one end effector 48, and even up to at least 16 end effectors, to cover a number of manufacturing tasks simultaneously.

Figure 3A:
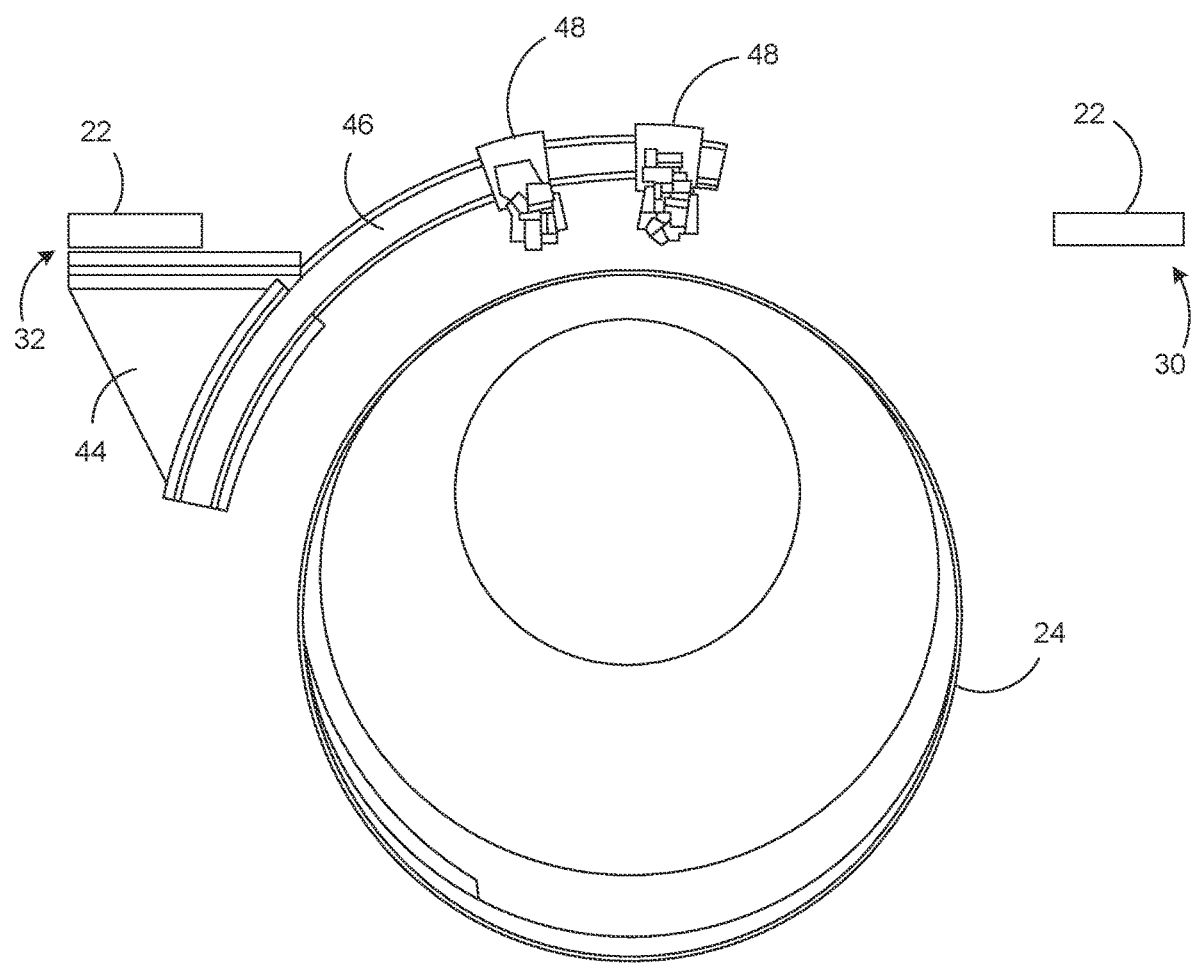
FIG. 3A is a partial end view of the robotic manufacturing system of FIG. 2 schematically showing the position of one articulated member carried by a mount which is engaged with a track, the articulated member carrying two end effectors, and being extended in a first direction.

FIG. 3A schematically shows an embodiment where a jointed member 46 having two end effectors 48 is extended entirely to one side by the mobile mount 44. This may be a state where the mobile mount 44 can be actuated forward or backward on the track 22 to be clear of a wing (not shown here) that may be mounted just below the mobile mount 44 and attached to the fuselage 24 on the left side. Once clear of the wing, the jointed member 46 may be free to return to a central position on the mount 44, or any position as needed, to accomplish an underlying manufacturing task. From this perspective, it is seen that the jointed member 46 is also formed sympathetic to the underlying manufactured item 24. That is, the shape of the jointed member 46 is curved similar to the fuselage 24.

Figure 3B:
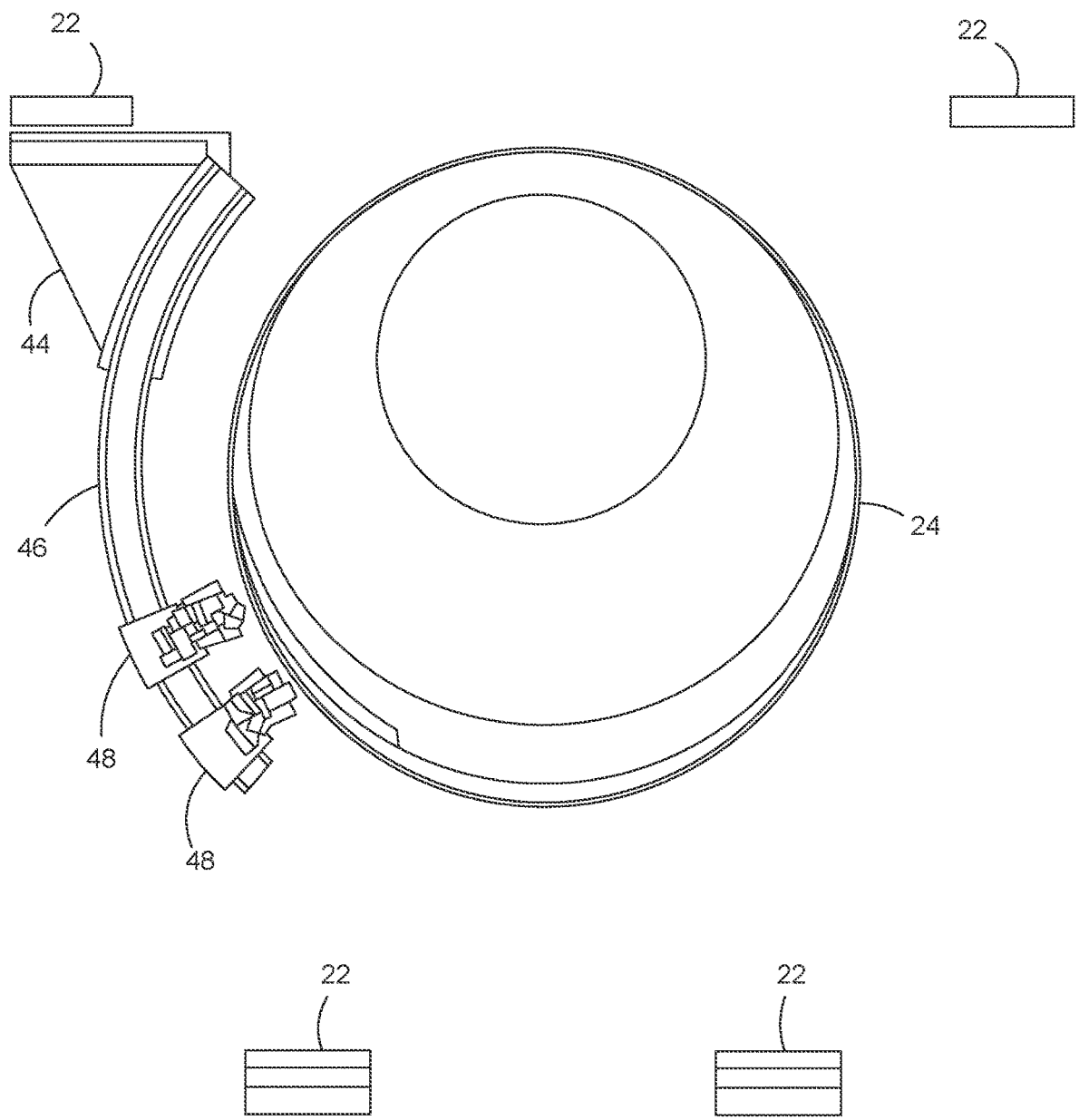
FIG. 3B is a view similar to the view of FIG. 3A, with the articulated member being extended in a second direction.

FIG. 3B shows an embodiment where the jointed member 46 has two end effectors 48 and is extended entirely to another side by the mobile mount 44. This may be a state where the mobile mount 44 can be actuated forward or backward on the track 22 to be clear of a tail fin (not shown here) that may be mounted on the top center of the fuselage 24. Once clear of the tail fin, the jointed member 46 may be free to return to a central position on the mount 44 or any position as needed to accomplish an underlying manufacturing task. From this perspective, it can be seen that the jointed member 46 is also formed sympathetic to the underlying manufactured item 24. That is, the shape of the jointed member 46 is curved similar to the shape of the fuselage 24.

Figure 4:
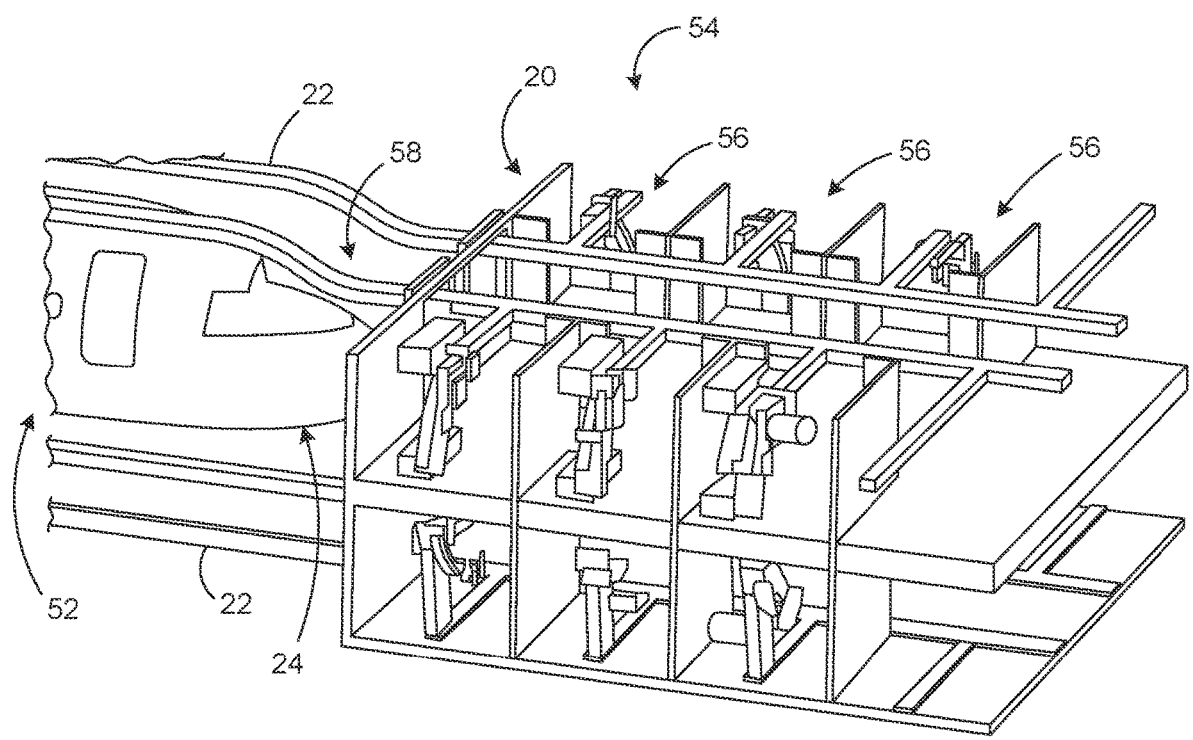
FIG. 4 is a side perspective schematic view of the robotic manufacturing system of FIG. 1, with the tracks shaped sympathetically to a nose end of the fuselage and extending into a set of storage and servicing stations.

FIG. 4 shows a forward end 50 of an embodiment of a manufacturing system 20 having sympathetic rails 22 positioned adjacent to a fuselage 24 of an airplane 52.

The tracks 22 are assembled around the fuselage 24 or airplane 52, once positioned in a manufacturing bay. The tracks 22 are shaped along the contour of the underlaying manufactured item 24. In FIG. 4, the sympathetic tracks 22 culminate at a "front" end 54 at end effector interchange stations 56. Thus, depending on what task is to be accomplished (sanding, cleaning, painting, welding, and the like, a specific task focused set of end effectors 48 may be deployed from dedicated stations 56 at the fore of the fuselage 24. In this manner, the interchangeability of the system 20 can be accommodated by having stations 56 for dedicated tasks (e.g., refilling paint, changing sanding elements, and the like).

From this perspective, it can be seen that the four tracks 22 are formed sympathetic to the underlying manufactured item 24 around the cockpit area 58. That is, the shape of the upper right 30 and upper left 32 tracks 22 is curved similar to the fuselage 24. Such curvatures may also be present in systems dedicated to manufacturing wings, whether already attached to the fuselage, or as a stand-alone system.

End effectors 48 may be interchangeable and stored in stations 56 at the forward end 54 of this manufacturing environment. As one set of end effectors 48 are being serviced within a dedicated storage area 56, other task-specific end effectors 48 can be deployed and functioning-even within the same task group. That is, one set of painters 48 can be in a station 56 getting cleaned or refilled while another set of painters 48 are painting portions of the airplane 52.

Figure 5:
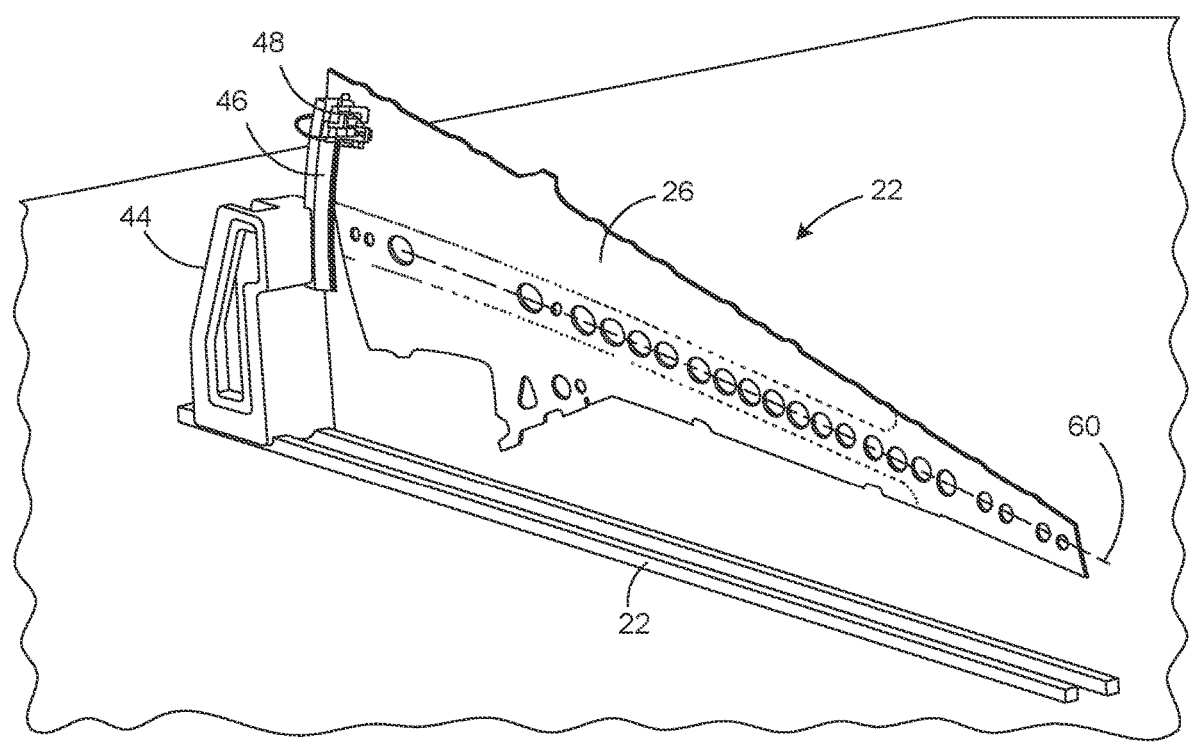
FIG. 5 is a side perspective view of a robotic manufacturing system having a single track arranged sympathetically to a wing component of an aircraft.

FIG. 5 shows an embodiment of a manufacturing system 20 having sympathetic tracks 22 positioned adjacent to the wing of an airplane 52. Other portions of an airplane, such as fuselages 24 are also discussed (see FIG. 2 above). In this embodiment, there is one sympathetic track 22 positioned along a lateral axis 60 of the wing 26. With this lateral track path 22 in place, it can be seen that the contour of the track paths 22 may match the contour of the wing 26. That is, this track path 22 is sympathetic to the underlying manufactured item 26 in that there exists the ability to deviate from a linear path along the wing 26. Additional deviations are possible because of the jointed member 46 attached to the mount 44. Further, multiple end effectors 48 may be mounted to a single jointed member 46 to accomplish manufacturing tasks simultaneously. Further yet, multiple mounts 44 may be mounted to the sympathetic track 22.

Each sympathetic track path 22 may have curvatures that are similar but not perfectly matched to the underlying manufactured part 24. In this respect, a generalized "bend" near an end of a wing (not shown in FIG. 5) may be positioned sympathetic enough to still undertake manufacturing tasks on a specific airplane wing, but also be able to do so on another similar but different airplane wing (e.g., different models of similarly sized airplanes).

That is, the path of the track 22 is not necessarily equivalent or identical to the contour of the underlying manufactured item, but rather just sympathetic to it in that the shape of the track generally follows the contour of the wing.

Further, the jointed member 46 may be sympathetic to a curvature of the wing as shown.

Figure 6:
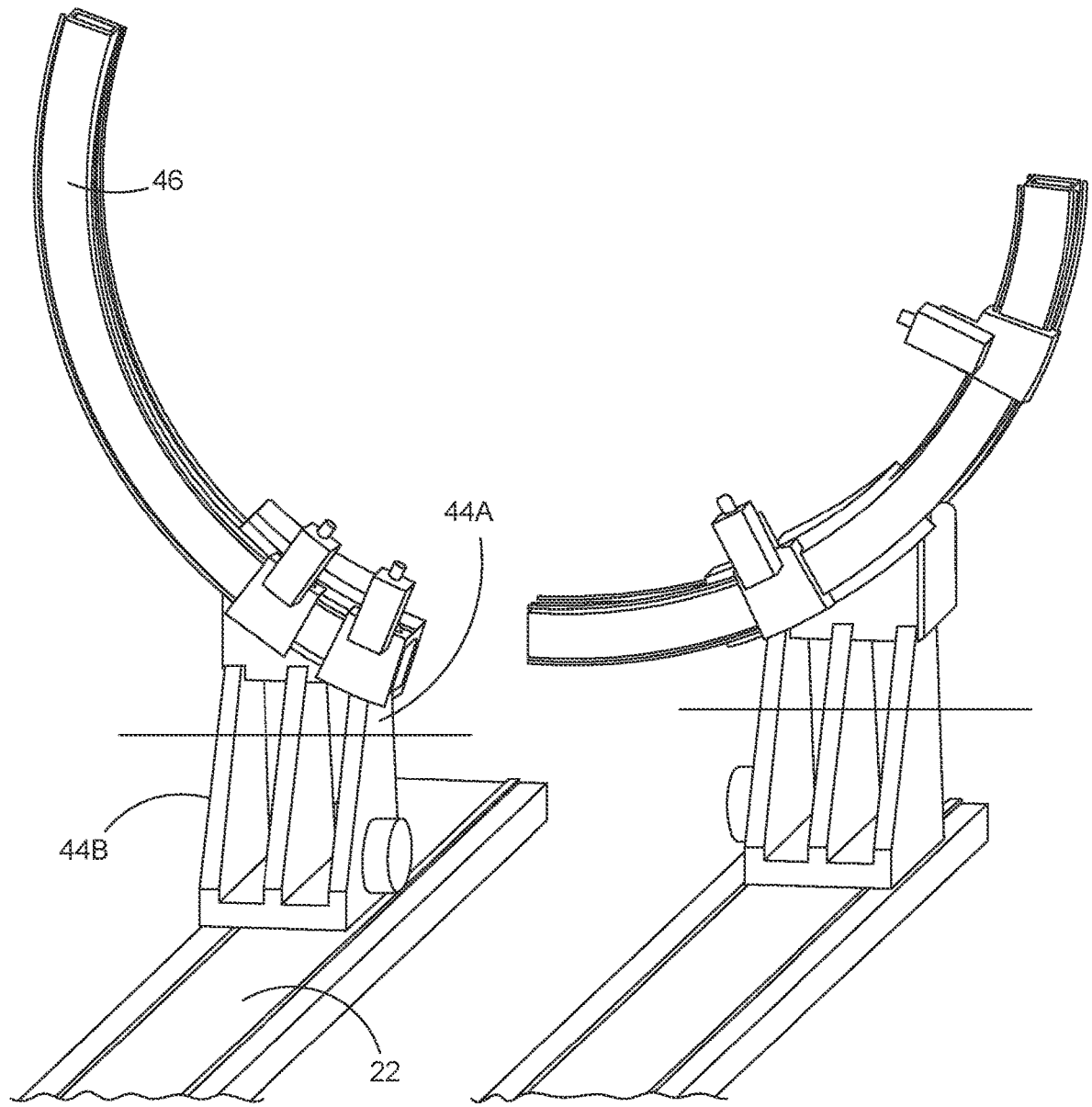
FIG. 6 is a partial end perspective schematic view of a robotic manufacturing system with two tracks, and with mounts that are variable in height to allow sympathetic movement of the jointed member as the jointed member and the mount move longitudinally along the track.

While the track 22 may have a "step" or other change in shape along its length to move the entire mount 44, and hence the jointed member 46 (vertically, for example), sympathetically, the mount 44 itself may have a separate portion 44A, as shown in FIG. 6, which may move sympathetically while another portion 44B remains fixed in two perpendicular directions relative to the track 22, which also remains in a fixed or constant position along its length relative to an underlying support, such as a floor. For example, an upper portion 44A of a lower mount 44 may be movable up and down, while an upper portion 44B of the same mount may be vertically (and laterally) fixed relative to the track 22.

Figure 7A:
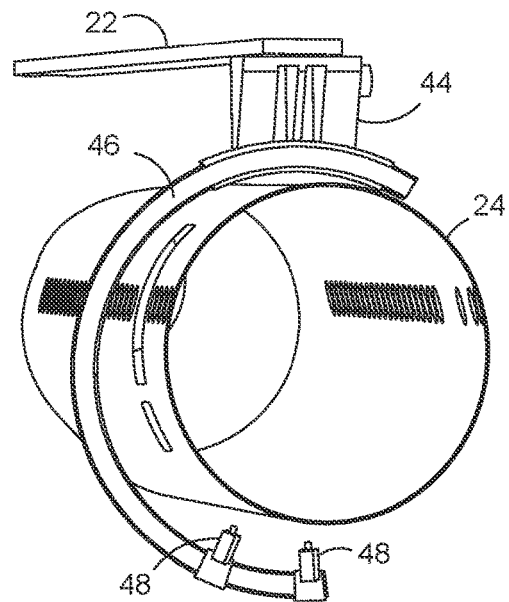
FIG. 7A is a perspective end view of a robotic manufacturing system with a single track positioned above a top surface of a fuselage component of a manufactured airplane item in which the jointed member is an arc extending in excess of 180 degrees around the fuselage with the ends of the arcuate jointed arm positioned at approximately 1 o'clock and 6 o'clock relative to the fuselage.
Figure 7B:
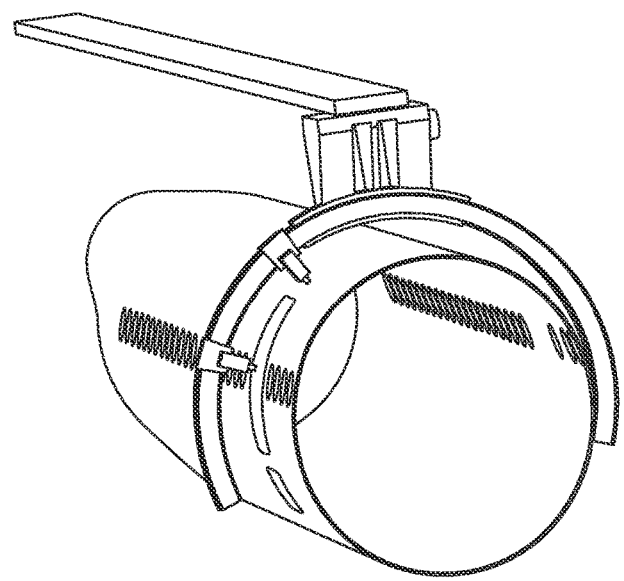
FIG. 7B is a perspective end view similar to FIG. 7A, with the jointed member moved so that the ends of the arcuate jointed member are positioned at approximately 8 o'clock and 4 o'clock relative to the fuselage.
Figure 7C:
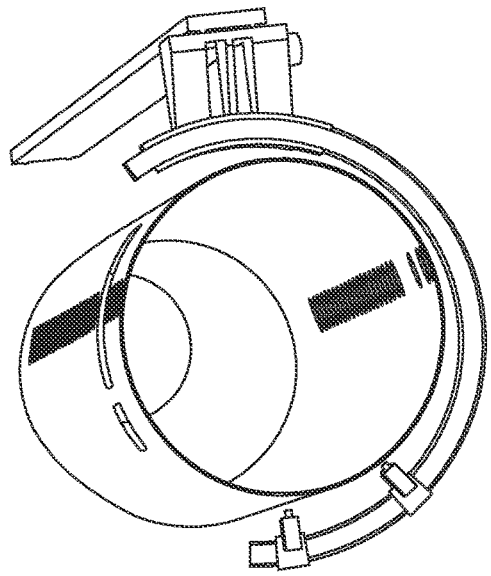
FIG. 7C is a perspective end view similar to FIG. 7A, with the jointed member moved so that the ends of the arcuate jointed member are positioned at approximately 11 o'clock and 6 o'clock relative to the fuselage.

In an embodiment shown in FIGS. 7A-7B, a single track 22 is provided for carrying the mount 44 and the jointed member 46 has an arcuate length of greater than 180 degrees such that more than one half of a circumference of the manufactured item component 24 may be reached by one or more end effectors 48, without moving the circumferential position of the jointed member 46. A movement of the jointed member 46 relative to the mount 44 will result in the one or more end effectors 48 being able to reach all other circumferential positions on the manufactured item component 24.

Figure 8:
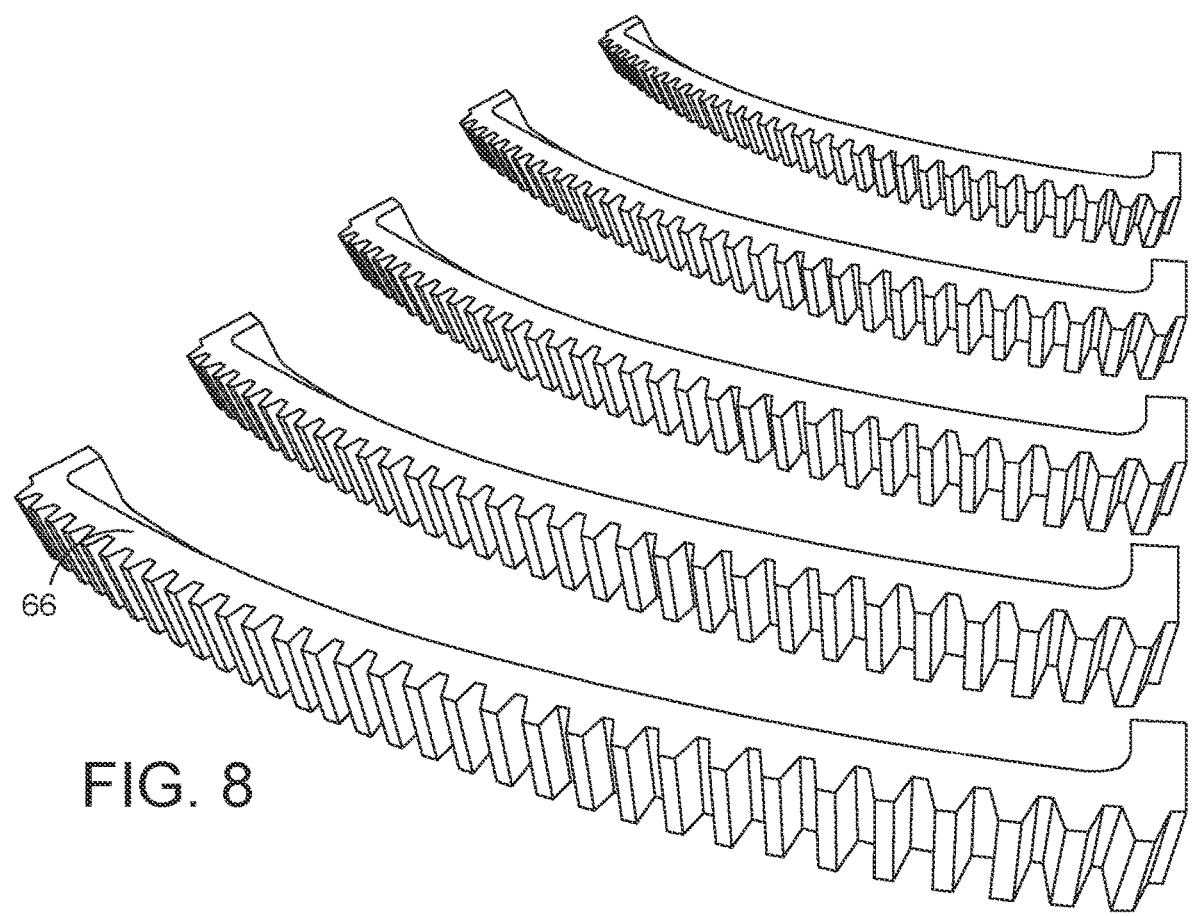
FIG. 8 is a side perspective view of a curved rack portion of a drive for the jointed member in the mount.
Figure 9:
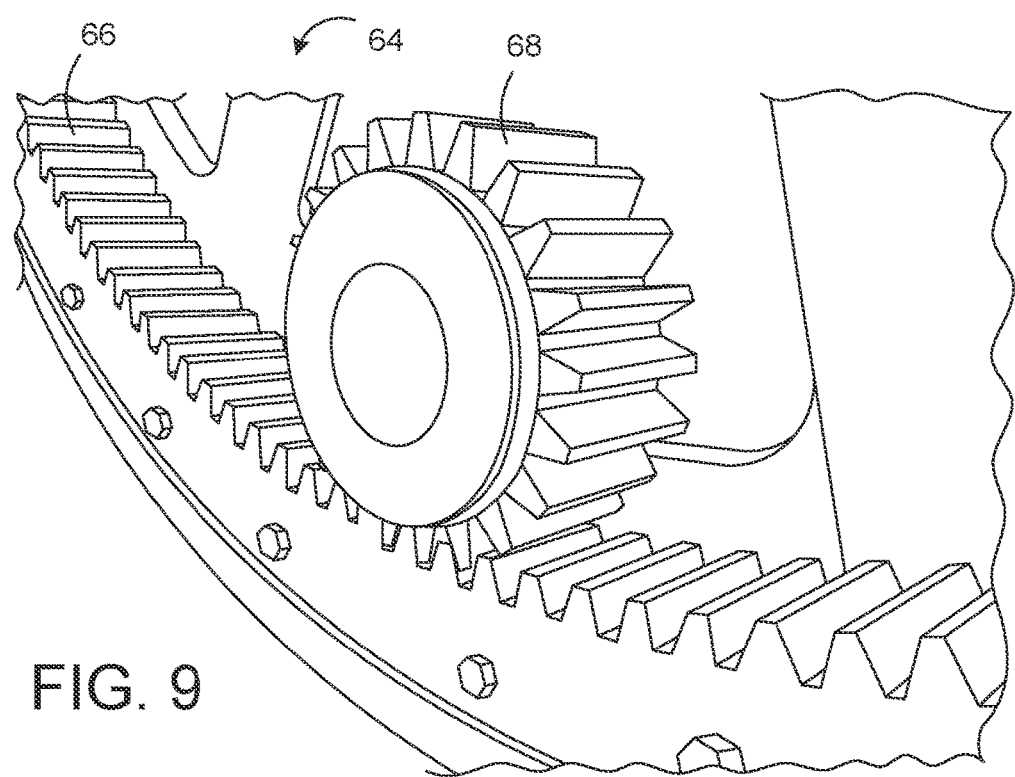
FIG. 9 is a side perspective view of a gear engaging the rack portion of FIG. 8.
Figure 10:
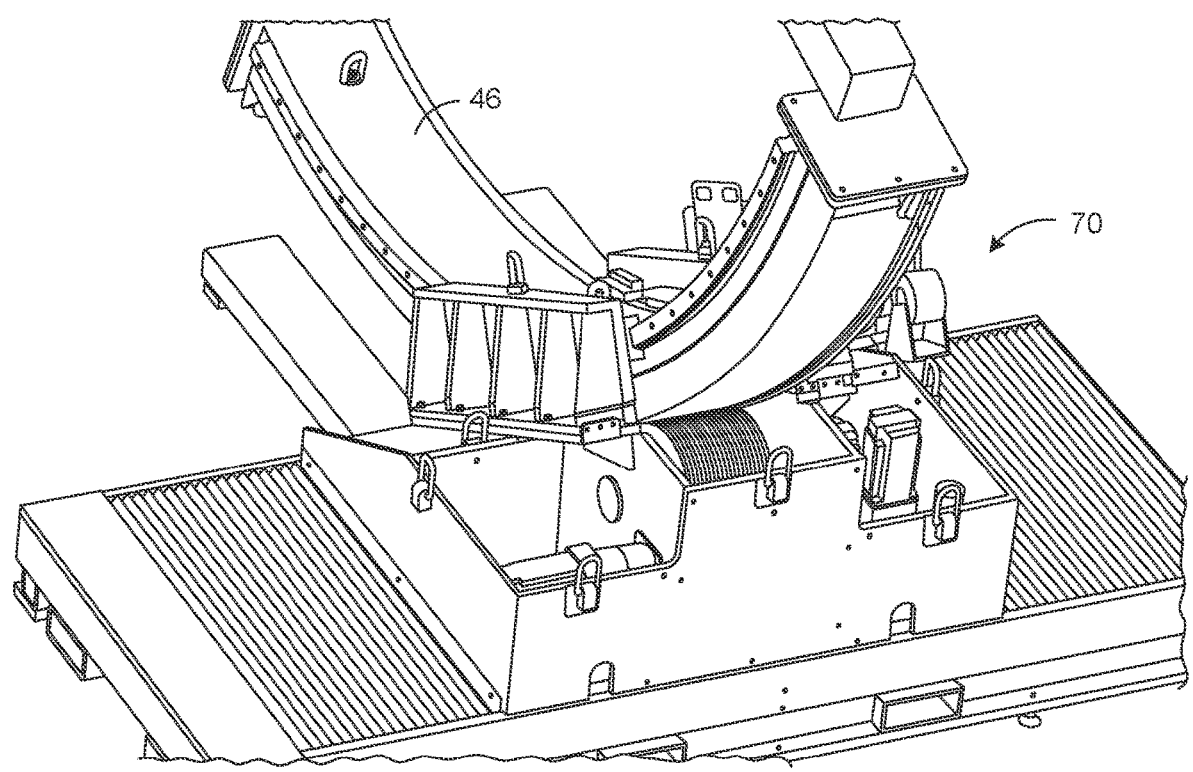
FIG. 10 is a side perspective view of a cable drive arrangement for the jointed member in the mount.

The jointed member 46 may be moved via a gear and rack system 64 as shown in FIGS. 8 and 9, with a rack 66 having an arcuate shape to match the shape of the jointed member 46 and a driven gear 68 moving the jointed member 46. Another arrangement for moving the jointed member 46 might be a cable drive system 70 shown schematically in FIG. 10 and described in greater detail in our co-pending U.S. patent application having Ser. No. 18/194,023 filed simultaneously on Mar. 31, 2023 herewith.

Figure 11:
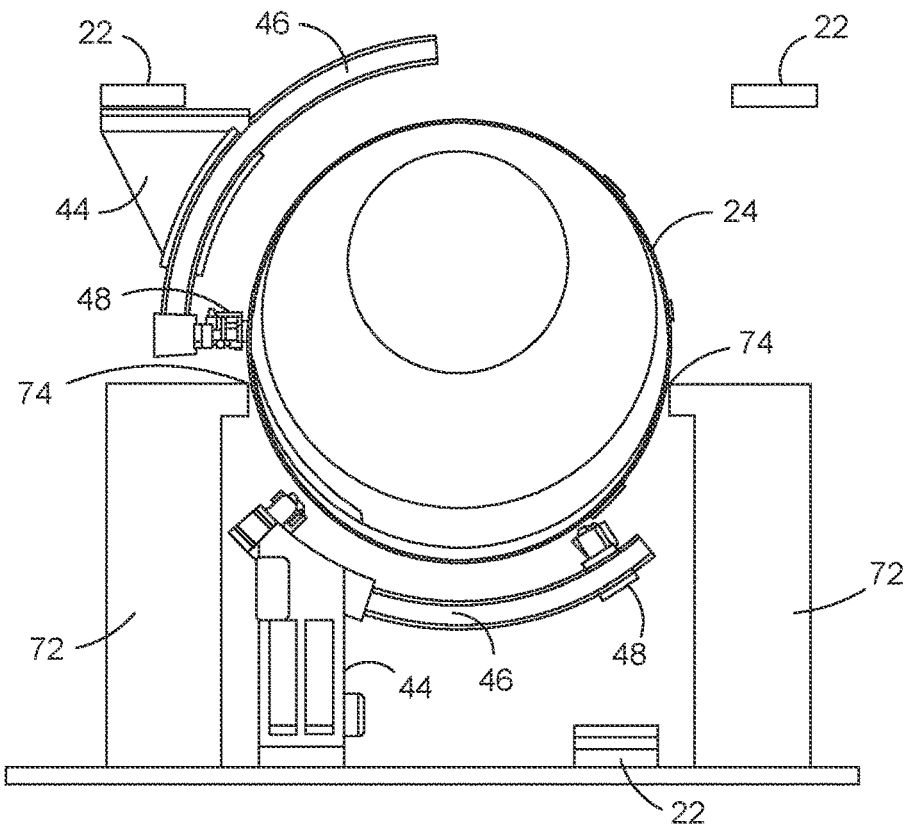
FIG. 11 is an end elevational schematic view of a robotic manufacturing system showing the positions of two jointed members, positioned to avoid contact with vertical support members for the fuselage.
Figure 12:
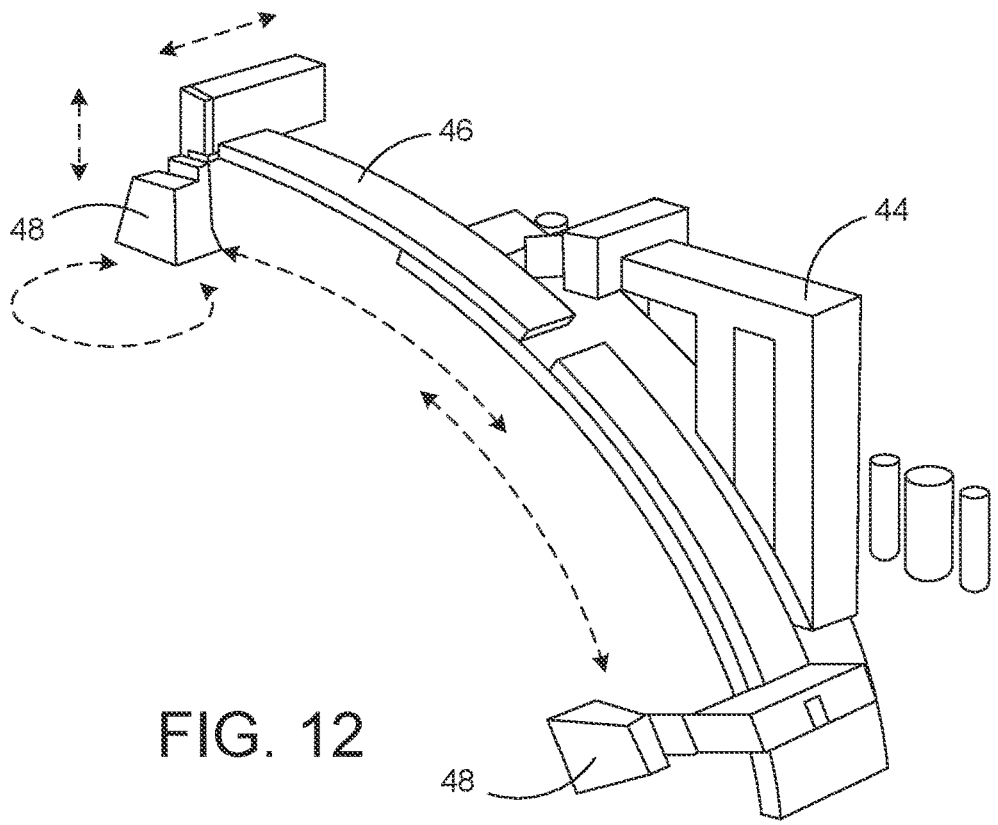
FIG. 12 is a side perspective view of two end effectors carried on a single jointed member and indicating ranges of movements for the end effectors.

In a situation, as shown in FIG. 11, where the manufactured item component 24 is held in an elevated position by vertical supports 72, and the end effectors 48 are required to be positioned both above the points of support 74, as well as below the points of support, the jointed members 46 may be moved to one side or another in the mount 44 so as to avoid contact with the supports 72 as the mount 44 is moved along the longitudinal direction of the component 24. Once the mount 44 has moved longitudinally past the support 72, the jointed member 46 can be moved in the mount 44 to reach higher or lower positions, as needed.

Thus, it is seen that the present invention provides a robotic manufacturing system 20 comprising:
 a track 22 extending along a length of a component 24 of a partially manufactured item 52, wherein the component has a non-constant longitudinal shape, the track being supported independently of the partially manufactured item,
 at least one jointed member 46,
 a mount 44 longitudinally movable along the track 22 and configured to receive the jointed member 46 in an articulating manner,
 at least one end effector 48 movably mounted on the jointed member 46,
 wherein the jointed member 46 is movable along at least a portion of the length of the component 24 in a generally radial position that is sympathetic to the non-constant longitudinal shape of the component.

A longitudinal shape of the track 22 may be sympathetic to the non-constant longitudinal shape of the component.

The mount 44 may be configured to change a horizontal position of the jointed member 46 as the mount longitudinally moves along the track 22 when the component 24 is arranged in a horizontal elongated position.

The jointed member 46 may have an elongated arcuate shape.

The jointed member 46 may be longitudinally movable relative to the mount 44 along an elongated arcuate shape of the jointed member such that the jointed member can move in an arc spaced from and around an outer surface of the component 24.

Two jointed members 46 may be received in the mount 44, each member 46 being independently longitudinally movable relative to the mount along the elongated arcuate shape of the jointed member, such that each jointed member will move in an arc spaced from and around an outer surface of the component.

The jointed member 46 may extend through of an arc of greater than 180 degrees along the elongated arcuate shape of the jointed member.

The jointed member 46 may extend through of an arc of less than 180 degrees along the elongated arcuate shape of the jointed member.

At least a portion of the end effector 48 may have at least 6 degrees of freedom of movement relative to the jointed member.

At least a portion of the end effector 48 may be movable along a length of the jointed member 46.

At least a portion of the end effector 48 may be movable laterally relative to the jointed member 46.

At least a portion of the end effector 48 may be movable radially relative to the elongated arcuate shape of the jointed member 46.

At least a portion of the end effector 48 may be movable angularly relative to the jointed member 46.

At least one jointed member 46 may be configured to carry a plurality of end effectors 48.

Each end effector 48 of the plurality of end effectors may be independently movable on the jointed member 46.

The track 22 may be positioned above a top of the component 24 when the component is arranged in a horizontal elongated position.

The track 22 may be positioned below a bottom of the component 24 when the component is arranged in a horizontal elongated position.

The end effector 48 may be interchangeably mounted on the jointed member 46.

The end effector 48 may be configured to perform a task consisting of at least one of: sanding, cleaning, preparing, painting, drilling, welding, fastening, inspecting, printing.

The track 22 may terminate in an interchange station 56 wherein the end effector 48 may be removed from the jointed member 46 and replaced with a different end effector.

The component may be a fuselage 24 of an aircraft 52.

The component may be a wing 26 of an aircraft 52.

The non-constant shape of the component 24 may comprise generally a cylinder having a non-constant diameter along a length thereof.

The non-constant shape of the component 24 may comprise a shape that tapers along a length thereof.

More than one track may 22 be provided adjacent to the component 24.

More than one mount 44 may be movably mounted on the track 22.

A method of manufacturing a component 24 of a partially manufactured item 52, utilizing a robotic manufacturing system 20 is provided, where the robotic manufacturing system includes a track 22 extending along a length of the component 24 of the partially manufactured item 52, wherein the track 22 has a non-constant longitudinal shape, and is supported independently of said component, there is at least one jointed member 46, a mount 44 is longitudinally movable along the track 22 and is configured to receive the jointed member 46 in an articulating manner, at least one end effector 48 is mounted on the jointed member, wherein the jointed member 46 is movable along at least a portion of the length of the component 24 in a path that is sympathetic to the non-constant longitudinal shape of the component. The method comprises the steps:
 moving, in a first moving step, at least one of the mount 44, the jointed member 46, or the end effector 48 relative to the track 22, to position at least a portion of the end effector 48 in an operating position relative to the component 24,
 operating the end effector 48 to perform a manufacturing step on the component 24,
 moving, in a second moving step, at least one of the mount 44, the jointed member 46, or the end effector 48 relative to the track 22 to distance the at least a portion of the end effector 48 from the operating position.

The first moving step may comprise moving the jointed member 46 in a path that is sympathetic to the non-constant longitudinal shape of the component.

The first moving step may comprise moving the mount 44 longitudinally along the track 22.

The first moving step may comprise moving a portion of the mount 44 to change a vertical position of the jointed member 46 relative to the component 24.

The jointed member 46 may have an elongated arcuate shape and the first moving step may comprise moving the jointed member 46, along the elongated shape of the jointed member relative to the mount 44, to move the jointed member in an arc spaced from and around an outer surface of the component 24.

The first moving step may comprise moving at least a portion of the end effector 48 through at least one of 6 degrees of freedom of movement relative to the elongated arcuate shape of the jointed member 46.

The first moving step may comprise moving at least a portion of the end effector 48 along a length of the jointed member 46.

The first moving step may comprise moving at least a portion of the end effector 48 laterally relative to the jointed member 46.

The jointed member 46 may have an elongated arcuate shape and the first moving step may comprise moving at least a portion of the end effector 48 radially relative to the elongated arcuate shape of the jointed member 46.

The first moving step may comprise moving at least a portion of the end effector 48 angularly relative to the jointed member 46.

At least one jointed member 46 may be configured to carry a plurality of end effectors 48, and the first moving step may comprise moving each end effector 48 independently on the jointed member.

The end effector 48 may be interchangeably mounted on the jointed member 46, and following the second moving step, the end effector may be moved to an interchange station 56 wherein the end effector 48 is removed from the jointed member 46 and replaced with a different end effector 48.

More than one track 22 may be provided adjacent to the component 24, and jointed members 45, mounts 44 and end effectors 48 may be carried on each track 22, such that the first moving step may be undertaken at more than one track simultaneously.

More than one mount 44 may be movably mounted on the track 22, such that the first moving step may comprise moving more than one mount 44 simultaneously.

More than one end effector 48 may be movably mounted on the jointed member 46, such that the first moving step may comprise moving more than one end effector simultaneously.

In another embodiment, a method of manufacturing a manufacturing a component of a partially manufactured item, utilizing a robotic manufacturing system 20 is provided wherein the robotic manufacturing system comprises a track 22 extending along a length of the component 24 of the partially manufactured item 52, wherein the component 24 has a non-constant longitudinal shape and at least one horizontal or vertical projection or support 72 extends from a surface of the component 24, the track 22 being supported at a distance from and independently of the component 24, at least one jointed member 46, a mount 44 longitudinally movable along the track 22 and configured to receive the jointed member 46 in an articulating manner, at least one end effector 48 mounted on the jointed member 46, wherein the jointed member is movable along at least a portion of the length of the component 24 in a path that is sympathetic to the non-constant longitudinal shape of the component. The method comprises the steps:

moving, in a first moving step, the jointed member 46, to a position where an end of the jointed member 46 will avoid contact with the at least one horizontal or vertical projection 72 while the mount 44, in a second moving step, is moving along the track 22 horizontally past the at least one horizontal or vertical projection 72, moving, in a third moving step, the jointed member 46, to a position in which the end of the jointed member would otherwise contact the at least one horizontal or vertical projection 72 if the mount 44 and jointed member 46 would be moved relative to the track 22 into a region vertically aligned with the at least one horizontal or vertical projection 72, moving, in a fourth moving step, at least one of the mount 44, the jointed member 46, or the end effector 48 relative to the track 22 to position at least a portion of the end effector 48 in an operating position relative to the component 24, operating the end effector 48 to perform a manufacturing step on the component 24, moving, in a fifth moving step, at least one of the mount 44, the jointed member 46, or the end effector 48 relative to the track 22 to distance the at least a portion of the end effector 48 from the operating position.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. A robotic manufacturing system comprising:
a track extending along a length of a component of a partially manufactured item, wherein the component has a non-constant longitudinal shape, the track being supported independently of said partially manufactured item,
at least one jointed member having an elongated arcuate shape,
a mount longitudinally movable along said track and configured to receive said jointed member in an articulating manner,
at least one end effector movably mounted on said jointed member,
wherein said jointed member is movable along at least a portion of the length of the component in a radial position that is sympathetic to the non-constant longitudinal shape of said component,
wherein the jointed member is longitudinally movable relative to said mount along its elongated arcuate shape such that the jointed member will move in an arc spaced from and around an outer surface of said component, and
wherein at least a portion of the end effector is movable along a length of the jointed member.

2. The robotic manufacturing system of claim 1, wherein the mount is configured to change a horizontal position of the jointed member as the mount longitudinally moves along the track when the component is arranged in a horizontal elongated position.

3. The robotic manufacturing system of claim 1, wherein two jointed members are received in the mount, each member being independently longitudinally movable relative to said mount along the elongated arcuate shape of said jointed member, such that each jointed member will move in an arc spaced from and around an outer surface of said component.

4. The robotic manufacturing system of claim 1, wherein the jointed member extends through of an arc of at least 90 degrees along the elongated arcuate shape of the jointed member.

5. The robotic manufacturing system of claim 1, wherein at least a portion of the end effector has at least 2 degrees of freedom of movement relative to the jointed member.

6. The robotic manufacturing system of claim 1, wherein at least a portion of the end effector is:
 movable laterally relative to the jointed member,
 movable radially relative to the elongated arcuate shape of the jointed member,
 movable angularly relative to the jointed member, or
 movable in any combination of the preceding ways.

7. The robotic manufacturing system of claim 1,
 wherein at least one jointed member is configured to carry a plurality of end effectors, and
 wherein each end effector of the plurality of end effectors is independently movable on said jointed member.

8. The robotic manufacturing system of claim 1,
 wherein the end effector is interchangeably mounted on the jointed member, and
 wherein the track terminates in an interchange station wherein the end effector may be removed from the jointed member and replaced with a different end effector.

9. The robotic manufacturing system of claim 1, wherein the end effector is configured to perform a task consisting of at least one of: sanding, cleaning, preparing, painting, drilling, welding, fastening, inspecting, printing.

10. The robotic manufacturing system of claim 1, wherein the component comprises:
 a fuselage of an aircraft,
 a wing of an aircraft, or
 both.

* * * * *